United States Patent [19]
Hokari

[11] 3,765,315
[45] Oct. 16, 1973

[54] DEVICE FOR INTERCHANGEABLE LENSES FOR SWITCHING BETWEEN EXPOSURE METER OPERATION AND MANUAL EXPOSURE OPERATION

[75] Inventor: Saburo Hokari, Kawasaki-shi, Japan
[73] Assignee: Ricoh Co., Ltd., Tokyo, Japan
[22] Filed: May 10, 1972
[21] Appl. No.: 251,977

[30] Foreign Application Priority Data
May 10, 1971 Japan..........................46/30520

[52] U.S. Cl................................. 95/64 R, 95/64 B
[51] Int. Cl. ............................................. G03b 9/02
[58] Field of Search ..................... 95/42, 64 R, 64 B

[56] References Cited
UNITED STATES PATENTS
3,352,220  11/1967  Lang et al............................. 95/64 R
3,442,192  5/1969   Sato...................................... 95/64 B UX
3,466,994  9/1969   Holderbaum......................... 95/64 B
3,470,806  10/1969  Uno ...................................... 95/42
3,590,714  7/1971   Schops ................................. 95/64 B UX Primary Examiner—Samuel S. Matthews
Assistant Examiner—E. M. Bero
Attorney—Henry T. Burke et al.

[57] ABSTRACT

A device for interchangeable lenses of screw mount type for switching between EE (electronic eye) exposure operation and manual exposure operation is provided which generally comprises an EE aperture setting ring, an EE-Manual switching ring which is also used as a manual aperture setting ring, and a rocking lever which may be selectively engaged with either of said two rings. When the switching ring is set to the manual exposure operation, the rocking lever engages with the manual aperture setting cam surface of the switching ring and is limited in rotation, but when the switching ring is set to the EE exposure operation, the rocking lever is disengaged from the manual aperture setting cam surface and is engaged with the EE aperture setting cam surface of the EE aperture setting ring and is limited in rotation. An aperture blade actuating ring is rotated in response to the angle of rotation of said rocking lever to close aperture blades to a selected aperture.

5 Claims, 4 Drawing Figures

PATENTED OCT 16 1973 3,765,315

DEVICE FOR INTERCHANGEABLE LENSES FOR SWITCHING BETWEEN EXPOSURE METER OPERATION AND MANUAL EXPOSURE OPERATION

BACKGROUND OF THE INVENTION

The present invention relates to a device for interchangeable lenses of screw mount type for use with single-lens reflex cameras of EE type for switching between EE (electric eye) exposure operation and manual exposure operation.

The same inventor has disclosed an EE exposure control mechanism for EE single-lens reflex cameras of the type using interchangeable lenses of screw mount type in which a coupling ring on the side of a camera body and an EE aperture setting ring on the side of an interchangeable lens which are normally not operatively coupled to each other may be correctly operatively coupled when a shutter button or the like is released so that the positive and secure coupling therebetween may be established even though the relative angular position between the lens mount on the side of the camera body and the interchangeable lens changes from time to time when mounted. When the EE exposure operation is switched to the manual exposure operation a coupling member which has been interconnecting between an EE aperture setting ring and an aperture ring is disconnected from the latter, and when the manual exposure operation is switched to the EE exposure operation, a manual aperture setting ring is disconnected from the aperture ring. From the standpoint of the camera operation, it is most desirable that a ring for switching between EE exposure operation and manual operation to be referred to as " EE-Manual switching ring" be used also as a manual aperture setting ring.

In the EE single-lens cameras of the type mounting bayonet mount type interchangeable lenses, the angular displacement of the EE-Manual switching ring may be transmitted with ease to the camera body, but in the EE single-lens cameras of the type mounting interchangeable lenses of screw mount type, the systems used in the interchangeable lenses of bayonet mount type cannot be used because the relative angular position between the interchangeable lens of screw mount type and the camera body or lens mount changes from time to time.

SUMMARY OF THE INVENTION

Briefly stated, according to the present invention, an interchangeable lens of screw mount type is provided with an EE aperture setting ring and an EE-Manual switching ring. A rocking lever which controls an aperture ring is so biased as to normally engage with one of the two rings, but in response to the angular displacement of the EE-Manual switching ring, the rocking lever is caused to disengage from the one ring so as to engage with the other ring. Hence, the switching between the EE exposure operation and manual exposure operation of the side of the interchangeable lens may be effected independently of the mechanism on the side of the camera body.

As described above, according to the present invention the switching between EE exposure operation and manual exposure operation may be effected independently of the mechanism on the side of the camera body, the device of the present invention is best suited for use with the interchangeable lenses of screw mount type whose relative angular position when mounted on the camera body changes from time to time and from one to another.

Furthermore, the interchangeable lenses of screw mount type incorporating the present invention may be of course mounted on the cameras of lens mount type other than the EE cameras. The aperture setting cams are provided separately for the EE and manual exposure operations so that the spacing between the adjacent graduated aperture scales may be increase and the gradient of the curve of the displacement-time diagram for a cam for controlling the rocking lever may be made small. As a result, the error in position of the EE and manual aperture setting rings will less adversely affect the accuracy of a selected aperture, and the graduated aperture scales may be more clearly viewed. Moreover, it is no required to stop the rotation of the EE aperture setting ring so that the number of parts used for switching between EE and manual exposure operations may be reduced, and the accuracy will not be adversely affected at all by the switching between the EE and manual exposure operations.

The above and other objects, features and advantages of the present invention will become more apparent from the following description of the preferred embodiments thereof taken in conjunction with the accompanying drawing.

DESCRIPTION OF THE PREFERRED EMBODIMENTS

As used in the following description, the term "EE exposure operation" will be understood to refer to operation wherein the diaphragm aperture of a camera is set by an exposure meter which includes an electric eye. The term "manual exposure operation" refers to operation wherein the diaphragm aperture is set manually. The term "EE aperture setting ring" refers to a ring (incorporated in the device of the invention) which cooperates with other elements in effecting the setting of the diaphragm aperture by the exposure meter. The term "EE-manual switching ring" refers to a ring (also incorporated in the device of the invention) which serves the dual functions of switching between exposure meter setting and manual setting of the diaphragm aperture and providing the means for manually setting the aperture.

Figure 1A:
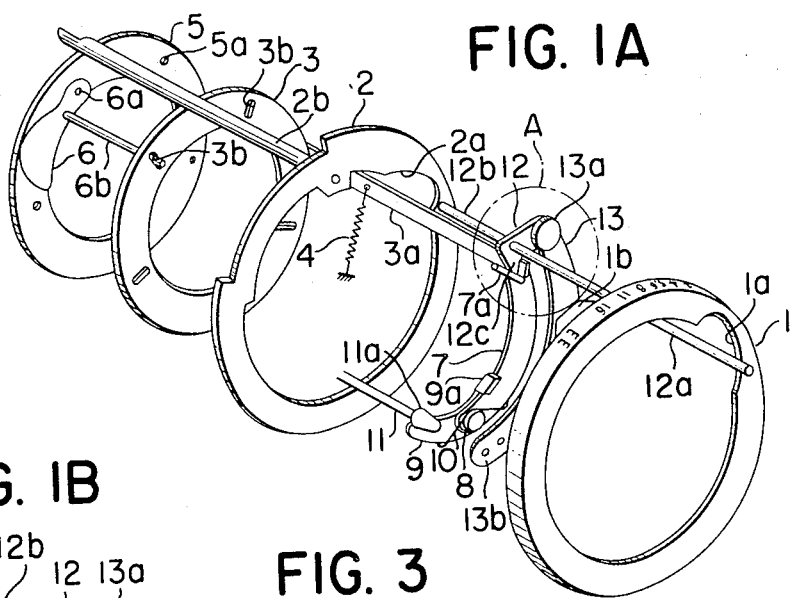
FIG. 1A is a perspective exploded view illustrating major component parts of a device for switching between EE and manual exposure operations for interchangeable lenses of screw mount type in accordance with the present invention, said device constituting one specific embodiment of the invention.
Figure 1B:
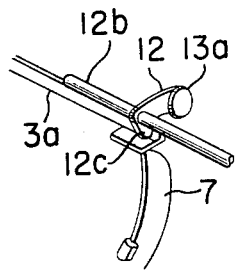
FIG. 1B is a perspective view illustrating on enlarged scale an encircled portion A in FIG. 1A.

Referring first to FIGS. 1A and 1B, there is shown a first embodiment of the invention, adapted for use with a single-lens reflex camera having an exposure meter (including an electric eye) for setting the diaphragm aperture, and a screw mount for threadedly mounting a lens barrel containing a suitable camera lens. Herein, the lens will be referred to as an interchangeable lens because it and its associated barrel can be removed from the screw mount and replaced with another lens and barrel, and the term "optical axis" will be understood to refer to the optical axis of the interchangeable lens. In this embodiment, an EE-Manual switching ring which is rotated for setting the camera into the EE exposure operation or the manual exposure operation has a manual aperture setting cam surface 1a formed at one portion of the inner periphery and a switching projection 1b extending from the back of the ring 1 toward the film in parallel with the optical axis of the interchangeable lens. The EE exposure index mark and the manual aperture setting marks are graduated around the outer periphery of the EE-Manual switching ring 1. An EE aperture setting ring 2 has an EE aperture setting cam surface 2a formed at one portion of the inner periphery and an EE coupling pin 2b extending from the back of the ring toward the film (not shown) within the camera body. The angular position of the EE aperture setting ring 2 is controlled through the coupling pin 2b by an EE exposure control mechanism incorporated in the camera. An aperture ring 3 which is rotatably mounted on a lens barrel has a pin 3a extending forwardly in parallel with the optical axis and a plurality of cam grooves 3b which are directed radially and are disposed in equiangular spaced apart relation with each other. A spring 4 is loaded between the pin 3a and the stationary member (not shown) of the interchangeable lens in order to bias the aperture ring 3 to normally rotate in the clockwise direction. A stationary aperture ring 5 has a plurality of equiangularly spaced apart holes 5a into which are loosely fitted pins 6a of aperture blades 6 (only one being shown in FIG. 1A). Pins 6b of the aperture blades 6 are loosely fitted into the elongated slots 3b of the aperture ring 3.

A semicircular sector lever which is pivoted with a pivot pin 8 has a pin 7a extending from the free end thereof and engaging with the pin 3a extending from the aperture ring 3. An actuating lever 9 which is pivoted with the pivot pin 8 coaxially of the sector lever 7 has a bent portion 9a in engagement with the sector lever 7 for preventing the relative rotation between the actuating lever 9 and the sector lever 7. A cone-shaped free end of an aperture setting pin 11 which is displaced in parallel with the optical axis is in engagement with the side edge of the actuating lever 9. A rocking lever 12 is pivoted to one end of a leaf spring 13 with a pivot 13a, and has a pair of coaxial pins 12a and 12b extending forwardly and backwardly in parallel with the optical axis. The free end 12c of the rocking lever 12 is in engagement with the pin 3a of the aperture ring 3. The base 13b of the leaf spring 13 is securely fixed to the lens barrel. Under the condition shown in FIG. 1, the pin 12a is biased toward the EE-Manual switching ring 1 under the force of the leaf spring 13. When the EE-Manual switching ring is rotated from the position shown in FIG. 1 in the clockwise direction to the EE exposure position, the switching projection 1b forces the pivot 13a to move in parallel with the optical axis so that the pin 12a is released from the cam surface 1a whereas the pin 12b is caused to engage with the cam surface 2a of the EE aperture setting ring 2. In other words, the rocking lever 12 moves angularly (on pivot 13a) about an axis which extends parallel to the aforementioned optical axis of the interchangeable lens. The rocking lever is also translatable (together with its pivot 13a) along its axis of angular movement, i.e., in either of two opposed directions along a path parallel to the optical axis, for movement of the pins 12a and 12b as described; this translation of the rocking lever is produced by the described movement of pivot 13a (to which it is attached), in either of two opposed directions parallel to the optical axis, by spring 13 and projection 1b.

Figure 2:
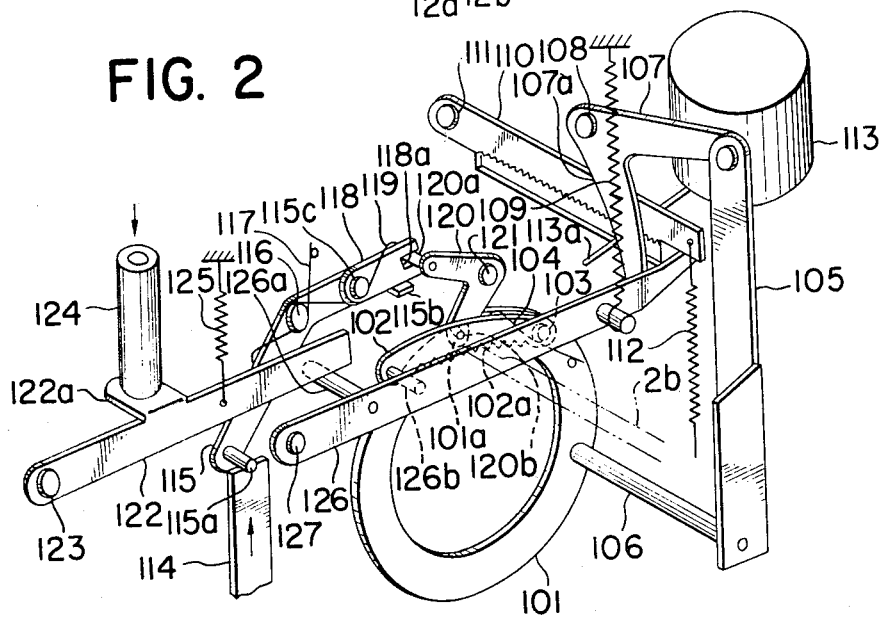
FIG. 2 is a perspective exploded view illustrating an EE exposure control mechanism on the side of a camera body which is used in conjunction with the device of the present invention.

Next referring to FIG. 2, the EE exposure control mechanism incorporated in the camera body and disclosed by the inventor will be briefly described hereinafter because the device of the present invention is used together with this control mechanism. The control mechanism has a coupling ring 101 which is rotatably mounted around the lens mount (not shown) of the camera body and has a groove 101a. An error compensating pawl 102 which is pivoted to the coupling ring 101 with a pivot 103 is biased under the force of a spring 104 loaded between the coupling ring 101 and the error compensating pawl 102 so that the latter is normally rotated in the counterclockwise direction. The error compensating pawl 102 has a saw-toothed portion 102a whose length must be longer than the tolerance in the direction of the circumference of the lens mount allowed when the interchangeable lens is mounted on the camera. A connecting lever 105 is pivoted to a pin 106 extending from the coupling ring 101, and an EE cam lever 107 is pivoted to the camera body with a pivot 108 and is caused to rotate in the clockwise direction when the connecting lever 105 is lowered. One arm of the EE cam lever 107 is pivoted to the connecting lever 105 whereas the other arm is provided with a cam surface 107a. A pointer catcher 110 which is pivoted to the camera body with a pivot 111 and is biased to normally rotate in the clockwise direction under the force of a spring 112, is adapted to catch together with the EE cam lever 107 a pointer 113a of an exposure meter 113 so that the angle of rotation of the coupling ring 101 may be controlled in response to the angle of deflection of the pointer 113a of the exposure meter 113. A slide lever 114 is vertically displaced by a mechanism (not shown) so as to raise or lower a mirror frame (not shown). A rocking lever 115 which is pivoted to the camera body with a pivot 116 is biased to normally rotate in the counterclockwise direction under the force of a spring 117, and has a coupling pin 115a and a bent portion 115b. A connecting lever 118 which is pivoted to the rocking lever 115 with a pivot 115c is biased to normally rotate in the clockwise direction under the force of a spring 119, and the rotation of the connecting lever 118 is limited by the bent portion 115b of the rocking lver 115. A bell crank 120 which is pivoted to the camera body with a pivot 121 has a pin 120a extending from the free end of one arm thereof and loosely fitted between a pair of arms of a bifurcated end 118a of the connecting lever 118. A pin 120b at the other end of the bell crank 120 is loosely fitted into the groove 101a of the coupling ring 101. A release lever 122 which is pivoted to the camera body with a pivot 123 is biased to normally rotate in the counterclockwise direction under the force of a spring 126 and has a horizontally bent portion or projection 112a in engagement with the lower end of a release button 124. A clutch lever 126 which is pivoted to the camera body with a pivot 127 has its free end engaged with the undersurface of the free end of the pointer catcher 110, a pin 126a in engagement with the undersurface of the release lever 122, and a pin 126b in engagement with the undersurface of the free end of the error compensating lever 102. The clutch lever 126 is biased to normally rotate in the counterclockwise direction under the force of the spring 109, whose spring force must be greater than the sum of the forces of the springs 104 and 112.

Therefore in the normal position the release lever 122 is biased to rotate in the counterclockwise direction under the force of the spring 125; the clutch lever 126 is also biased to rotate in the counterclockwise direction under the force of the spring 109; the saw-toothed portion 102a of the error compensating pawl 102 is released from the coupling pin 2b extending from the interchangeable lens and the pointer catcher 110 is rotated in the counterclockwise direction so that the pointer 113a of the exposure meter 113 is released.

Next the mode of operation will be described. When the release button 124 is depressed, the release lever 122 is caused to rotate in the clockwise direction so that the pin 126a causes the clutch lever 126 to rotate in the clockwise direction against the spring 109. As a reuslt, the error compensating pawl 102 and the pointer catcher 110 are released and the pointer catcher 110 is caused to rotate in the clockwise direction under the force of the spring 112 to press the pointer 113a against a stationary member. The error compensating pawl 102 is caused to rotate in the counterclockwise direction under the force of the spring 104 so that one of the saw teeth 102a engages with the coupling pin 2b extending from the interchangeable lens. Thereafter the slide lever 114 is raised under the force of a spring (not shown) so that the coupling ring 101 is caused to rotate in the clockwise direction through the rocking lever 115, the connecting lever 118, and the bell crank 120. Then, the EE cam lever 107 is caused to rotate in the clockwise direction through the pin 106 and the connecting lever 105 to engage with the pointer 113a. Therefore, the rotations of the coupling ring 101, the bell crank 120 and the connecting lever 118 are now stopped, and thereafter only the rocking lever 115 is permitted to further rotate through a predetermined angle by the slide lever 114 while charging the spring 119. Since the coupling pin 2b of the EE aperture setting ring 2 on the side of the interchangeable lens is in engagement with one of the saw teeth 102a of the error compensating pawl 102, it is rotated in unison with the coupling ring 101 so that the EE aperture setting ring 2 is rotated through an angle in response to the angle of deflection of the pointer 113a of the exposure meter 113. In this case, the mirror frame (not shown) is raised by a mechanism (not shown) so that the aperture pin 11 extends. As a result, the cone-shaped free end 11a of the aperture pin 11 causes the actuating lever 9 to rotate in the counterclockwise direction so that the sector lever 7 is caused to rotate in the counterclockwise direction under the force of the spring 10. The pin 7a of the sector lever 7 forces the pin 3a of the aperture ring 3 against the spring 4 so that the aperture ring 3 is caused to rotate in the counterclockwise direction and the aperture blades 6 are closed to a selected aperture. Next the shutter mechanism is actuated and upon completion of the shutter operation the slide lever 114 is lowered to return the mirror frame (not shown) to its normal position so that the aperture pin 11 is returned to the normal position to open the aperture blades and that the component parts in the mechanism for coupling the interchangeable lens to the EE exposure control mechanism in the camera body are all returned to their initial positions.

As will be apparent from the foregoing description and from the showing of FIG. 1A, the aperture-setting pin 11 extends in a direction parallel to the optical axis of the interchangeable lens, and is operatively interconnected with the aforementioned mirror frame so as to move longitudinally (i.e., in a direction parallel to the optical axis) in correspondence with raising and lowering of the mirror frame. When the mirror frame is raised (after depression of release button 124, but before operation of the shutter), pin 11 is thereby moved longitudinally outwardly (i.e., away from the film in the camera), bringing the wider portion of its cone-shaped end 11a into engagement with lever 9 and thereby depressing lever 9 so as to release lever 7 for aperture-closing upward (counterclockwise) movement. When the mirror frame is lowered upon actuation of the shutter, pin 11 is retracted longitudinally inwardly (toward the film) so that the narrower portion of its conical end 11a engages lever 9, permitting upward (clockwise) motion of lever 9 for restoration of lever 7 and the diaphragm elements to their initial positions. In other words, in the described device the counterclockwise movement of lever 7 by spring 10 provides the force for closing the aperture, such closure being limited (through the agency of rocking lever 12) either by the exposure meter or a manual setting (now to be described) so as to achieve the desired aperture setting; and the outward longitudinal movement of pin 11 upon raising of the mirror frame acts on lever 9 to permit such counterclockwise movement of lever 7 each time the mirror frame is raised.

In case of the manual exposure operation in which the EE-Manual switching ring 1 is located in the position shown in FIG. 1, the switching projection 1b is out of engagement with the pivot 13a so that the pin 12a of the rocking lever 12 is pressed against the manual aperture setting cam surface 1a under the force of the leaf spring 13, but the pin 12b is out of engagement with the EE aperture setting cam surface 2a. The rotation of the rocking lever 12 which in turn controls the rotation of the sector lever 7 under the force of the spring 10 is limited because the pin 12a engages with the manual aperture setting cam surface 1a of the EE-Manual switching ring 1. Therefore, the aperture may be set independently of the rotation of the EE aperture setting ring 2.

In case of the EE exposure operation, the EE-Manual switching ring 1 is rotated to the EE position. Then the projection 1b of the ring 1 pushes the pivot 13a toward the camera body against the leaf spring 13 so that the pin 12b may now engage with the EE aperture setting cam surface 2a whereas the pin 12a is out of engagement with the manual aperture setting cam surface 1a. Therefore, the angle of rotation of the rocking lever 12 is now controlled in response to the angle of rotation of the EE aperture setting ring 2 so that the aperture is set in response to the angle of deflection of the pointer 113a in the manner described hereinbefore.

Figure 3:
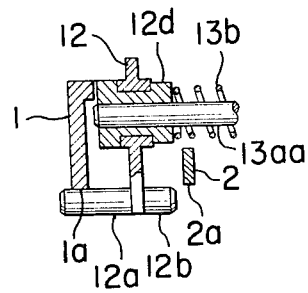
FIG. 3 is a fragmentary sectional view of a second embodiment of the invention incorporating a variation of a rocking lever switching mechanism in accordance with the present invention.

In the instant embodiment described above, the leaf spring 13 is used to engage or release the pins 12a and 12b of the rocking lever 12 with or from the manual and EE aperture setting cam surfaces 1a and 2a, but the present invention provides a variation as shown in FIG. 3. That is, FIG. 3 illustrates in pertinent detail a second embodiment of the invention differing from the above-described embodiment in that, in place of leaf spring 13, there is provided a coiled spring 13b for serving the same function of biasing the rocking lever 12 (in its path of translational motion parallel to the optical axis) toward ring 1. In this second embodiment, a bush 12d over which is fitted the rocking lever 12 is fitted over a pin 13a securely fixed to the lens barrel, and a coiled spring 13b is loaded between the bush 12d and a stationary member (not shown) so that in case of the manual aperture setting operation the pin 12a may be pressed against the manual aperture setting cam surface 1a under the force of the coiled spring 13b. In case of the EE aperture setting operation, the projection 1b presses the bush 12d against the coiled spring 13b so that the pin 12b may be pressed against the EE aperture setting cam surface 2a for EE exposure operation.

What is claimed is:

1. For an interchangeable camera lens of screw mount type, for use with a camera having means including a rotatable coupling ring for effecting setting of a diaphragm aperture by an exposure meter, a device for switching between exposure meter aperture-setting operation and manual aperture-setting operation, said device comprising:
   a. a first ring mounted for rotation, about an optical axis of an interchangeable lens, in coupled relation to and in unison with said coupling ring, said first ring having a first cam surface;
   b. a second ring manually rotatable about said optical axis and spaced from said first ring along said axis, said second ring having a second cam surface;
   c. a third rotatable ring for controlling the opening of a diaphragm aperture in correspondence with the angular position of said third ring;
   d. an angularly movable rocking lever for controlling the angular position of said third ring in accordance with the angular position of said rocking lever, said rocking lever being alternately engageable with said first and second cam surfaces for control of the angular position of the rocking lever by the cam surface engaged thereby, and said rocking lever being translatable along a path parallel to said optical axis into selective engagement with either of said first and second cam surfaces;
   e. means for exerting a biasing force on said rocking lever in a first direction along said path to urge said rocking lever into position for engagement with one of said cam surfaces; and
   f. means for translating said rocking lever along said path against said biasing force to move said rocking lever out of position for engagement with said one cam surface and into position for engagement with the other of said cam surfaces.

2. A device as defined in claim 1, including lens barrel structure supporting said lens, and wherein said biasing means comprises a leaf spring having opposite ends respectively fixed to said structure and supporting said rocking lever.

3. A device as defined in claim 1, including lens barrel structure supporting said lens, and wherein said biasing means comprises a coil spring interposed between said structure and said rocking lever.

4. In a device for selectively effecting setting of a camera diaphragm aperture by an exposure meter and manually, the combination including
   a. first and second rings rotatably mounted in spaced relation along a common axis, each of said rings having a cam surface, the first ring being couplable to means for rotating said one ring through an angle determined by an exposure meter, and the second ring being rotatable manually;
   b. a third ring rotatable to control the opening of a diaphragm aperture;
   c. an angularly displaceable rocking lever for limiting the extent of rotation of said third ring in accordance with the angular position of said rocking lever, disposed intermediate said two rings for translation along a path parallel to said common axis into selective engagement with either of said cam surfaces for limitation of the angular position of the rocking lever by the cam surface with which it is engaged;
   d. means for biasing said rocking lever along said path into engagement with said cam surface of said second ring; and
   e. means carried by said second ring and positionable by manual rotation thereof for pushing said rocking lever along said path, against the force of said biasing means, out of engagement with the cam surface of said second ring and into engagement with the cam surface of said first ring.

5. In a camera having a camera body with a screw mount and structure including a lens removably mounted thereon, aperture-controlling apparatus including
   a. an adjustable aperture-defining diaphragm removable with the lens;
   b. a rotatable coupling ring carried by the camera body; and
   c. an exposure meter carried by the camera body for controlling the extent of rotation of the coupling ring;
wherein the improvement comprises:
   d. a first ring, removable with the lens and mounted for rotation about an optical axis of the lens in coupled relation to and in unison with said coupling ring, said first ring having a first cam surface;
   e. a second ring removable with the lens, manually rotatable about the optical axis, and spaced from the first ring along the axis, said second ring having a second cam surface;
   f. a third rotatable ring, removable with the lens, for controlling the aperture of said diaphragm in correspondence with the angular position of said third ring;
   g. an angularly movable rocking lever, removable with the lens, for controlling the angular position of said third ring in accordance with the angular position of said rocking lever, said rocking lever being alternately engageable with said first and second cam surfaces for control of the angular position of the rocking lever by the cam surface engaged thereby, and said rocking lever being translatable along a path parallel to said optical axis into selective engagement with either of said first and second cam surfaces, for setting of said aperture by said exposure meter when said rocking lever is in engagement with said first cam surface and for manual setting of said aperture when said rocking lever is in engagement with said second cam surface;

h. means, removable with the lens, for exerting a biasing force on said rocking lever, in a first direction along said path to urge said rocking lever into position for engagement with one of said cam surfaces; and i. means, removable with said lens, for translating said rocking lever along said path against said biasing force to move said rocking lever out of position for engagement with said one cam surface and into position for engagement with the other of said cam surfaces.

* * * * *